(12) United States Patent
Glingener et al.

(10) Patent No.: US 6,516,113 B1
(45) Date of Patent: Feb. 4, 2003

(54) METHOD FOR REDUCING STIMULATED BRILLOUIN BACKSCATTER

(75) Inventors: Christoph Glingener, Feldkirchen-Westerham (DE); Erich Gottwald, Holzkirchen (DE); Werner Paetsch, Munich (DE); Walter Proebster, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 25 days.

(21) Appl. No.: 09/687,712

(22) Filed: Oct. 13, 2000

(30) Foreign Application Priority Data

Oct. 14, 1999 (DE) .......................... 199 49 626
Dec. 10, 1999 (DE) .......................... 199 59 713

(51) Int. Cl.$^7$ .............................. G02B 6/28; H04B 10/04
(52) U.S. Cl. .......................................... 385/24; 359/183
(58) Field of Search .......................... 385/24–25, 122; 359/160, 300, 183, 161, 162; 356/73.1

(56) References Cited

U.S. PATENT DOCUMENTS

| | | | | |
|---|---|---|---|---|
| 5,566,381 A | * | 10/1996 | Korotky | 359/161 |
| 5,724,126 A | * | 3/1998 | Nishi et al. | 356/73.1 |
| 4,560,246 A | | 6/1998 | Cotter | 385/27 |
| 6,307,667 B1 | * | 10/2001 | Liang | 359/337 |
| 6,323,993 B1 | * | 11/2001 | Hansen et al. | 359/337 |

OTHER PUBLICATIONS

R.G. Smith, "Optical Power Handling Capacity of Low Loss Optical Fibers as Determined by Stimulated Raman and Brillouin Scattering", *Applied Optics*, vol. 11, No. 11, Nov. 1972, pp. 2489–2494.

Carman et al, "Theory of Stokes Pulse Shapes in Transient Stimulated Raman Scattering", *Physical Review A*, vol. 2, No. 1, Jul. 1970, pp. 60–72.

Yamamoto et al, "Coherent Optical Fiber Transmission Systems", *IEEE Journal of Quantum Electronics*, vol. QE–17, No. 6, Jun. 1981, pp. 919–934.

Horiuchi et al, "Stimulated Brillouin Scattering Suppression Effects Induced by Cross–Phase Modulation in High Power WDM Repeaterless Transmission", *Electronics Letters*, vol. 34, No. 4, Feb. 1998, pp. 390–391.

Rogers H. Stolen, "Nonlinear Properties of Optical Fibers", *Optical Fiber Telecommunications*, Academic Press 1979, pp. 125–150.

* cited by examiner

Primary Examiner—Georgia Epps
Assistant Examiner—Omar Hindi
(74) Attorney, Agent, or Firm—Bell, Boyd & Lloyd LLC

(57) ABSTRACT

The stimulated Brillouin backscatter is reduced by non-linear effects, such as self-phase modulation or cross-phase modulation. Due to the cross-phase modulation, a bandwidth spread and, as result thereof, a reduction of the stimulated Brillouin backscatter is also achieved by supplying at least one amplitude-modulated pump signal.

21 Claims, 3 Drawing Sheets

METHOD FOR REDUCING STIMULATED BRILLOUIN BACKSCATTER

BACKGROUND OF THE INVENTION

The present invention is direction to a method for reducing the stimulated Brillouin backscatter or SBS in the transmission of light pulses or light waves via an optical fiber.

When, given transmission of optical signals within a specific bandwidth, the Brillouin bandwidth, the power of the signal supplied into the fiber exceeds a specific value referred to as a critical power or stimulated Brillouin scattering or SBS threshold, an optical backscatter is caused that leads to the fact that the transmitted power rises only sub-proportionally.

An article by R.G. Smith entitled "Optical Power Handling Capacity of Low Loss Optical Fibers as Determined by Stimulated Raman and Brillouin Scattering" from *Applied Optics*. Vol. 11, No. 11, November 1972, pp. 2489–2494 describes these laws concerning scattering.

In an article by Roger Stolen entitled "Nonlinear Properties of Optical Fibers" from *Optical Fiber Telecommunications*, Academic Press, 1979, pp. 125–150, the relationship between power and Brillouin backscatter for narrow and large bandwidths is described (see pages 133–134 of this article).

An article by Yamamoto et al entitled "Coherent Optical Fiber Transmission Systems" from *IEEE Journal of Quantum Electronics*, Vol. QE-17, No. 6, June 1981, pp. 919–934, recites an equation on page 927 wherein the bandwidth of the signal source was replaced by the bandwidth of the modulated signal. The author points out on the following page that the critical power for the Brillouin backscatter is dependent on the signal spectrum and increases with increased data rate, which, as known, leads to a broader spectrum. As in the above-mentioned article by Stolen, the condition recited in Smith that only the power within the Brillouin bandwidth is considered, of course, must be taken into consideration in the indicated estimate or a corresponding effective bandwidth must be identified.

Cotter (U.S. Pat. No. 4,560,246) employs angled modulation, which, as known, increases the bandwidth in order to reduce the Brillouin backscatter.

It is also known from an article by Carman et al entitled "Theory of Stokes Pulse Shapes in Transient Stimulated Raman Scattering*" *Physical Review A*, Vol.2, No.1, July 1970, pp. 60–72, that chirping of pulses increases the bandwidth. As a result thereof the Brillouin backscatter is reduced according to the above-mentioned articles by Stolen and Yamamoto et al. This chirping creates a frequently undesired effect in the direct intensity modulation of a laser.

All of these effects and measures lead to a bandwidth of a light wave supplied into an optical fiber or of a supplied light pulse, which is always increased and which results in other disturbing effects.

The self-phase modulation that leads to an increase in the frequency at the beginning of a pulse and then to a lowering of the frequency also effects a spread of the spectrum and a reduction of the Brillouin backscatter as soon as the Brillouin bandwidth is exceeded. A considerable self-phase modulation that leads to a substantial SBS reduction can be generated by optical semiconductor amplifiers, wavelength converters and other non-linear components.

An article by Horiuchi et al entitled "Stimulated Brillouin Scattering Suppression Effects Induced by Cross-Phase Modulation in High Power WDM Repeaterless Transmission" from *Electronics Letters*, Vol. 34, No. 4, Feb. 19, 1998, pp. 390–391, investigates the effect of cross-phase modulation on the spectra of WDM channels, wherein WDM is wavelength-division multiplex. Given this effect, the various transmission channels influence one another so that a spread of the spectrum likewise occurs. However, a relevant SBS suppression only occurs at high powers.

SUMMARY OF THE INVENTION

The object of the present invention is to provide a method for reducing the stimulated Brillouin scattering, wherein an additional enlargement of the bandwidth of the infed optical signal is not required.

This object is achieved by the utilization of non-linear effects according to an improvement in a method for transmission of intensity modulated light waves or light pulses via an optical fiber, wherein the light pulses comprise a spectral power density distribution that, without additional measures, causes Brillouin backscatter, with the improvement being generating, in the fiber, a spread of the frequency spectrum that reduces the stimulated Brillouin backscatter by a self-phase modulation.

In addition, the invention is directed to an improvement in a method for parallel transmission of a plurality of intensity modulated light waveguides or light pulses having different wavelengths via an optical fiber, wherein the light waves and light wave pulses comprise a spectral power density distribution that, without additional measures, causes Brillouin backscatter. The improvements are influencing the light waves and light wave pulse sequences by a cross-phase modulation so that the frequency spectrum is enlarged in at least one of the waveguides so that the stimulated Brillouin backscatter is reduced.

First, the self-phase modulation is utilized, and this leads to an increase in the frequency of the beginning of the pulse and then to a lowering of the frequency. This means a spread of the spectrum that, as soon as the Brillouin bandwidth is exceeded, leads to a reduction of the Brillouin backscatter. What is the determining factor for this procedure is the Kerr effect, which is described in the applicable literature.

Another possibility is to utilize the cross-phase modulation between different light waves given wavelength-division multiplex systems. In this effect, the various transmission channels influence one another so that a spread of the spectrum likewise occurs. By optimizing the mutual influencing, for example by selecting suitable frequency spacings between the transmission channels, this effect can be optimized.

Another solution is achieved by an improvement in a method for suppressing the Brillouin backscatter in a transmission of the intensity-modulated optical transmission signal or a plurality of intensity-modulated optical transmission signals with different wavelengths over an optical fiber, whereby the optical signals comprise a spectral power density distribution that, without additional measures, causes stimulated Brillouin backscatter. The improvement is the supplying into the optical fiber of at least one amplitude-modulated pump signal that influences the optical transmission signals by cross-phase modulation so that the stimulated Brillouin backscatter is reduced.

The application of the invention given optical wave division multiplex transmission systems is especially advantageous. The stimulated Brillouin scattering or backscatter reduction already effected by the cross-phase modulation can be significantly improved by at least one amplitude-modulated pump signal. Given a standard monomode fiber, the infeed of at least one amplitude-modulated pump signal is especially effective with a frequency that lies above the Brillouin bandwidth, usually between 20 MHz and 500 MHz. Higher frequencies can also be employed given low-dispersion fibers.

In order to keep the pump power of each and every pump laser low, a plurality of amplitude-modulated pump signals should be supplied that are optimally uniformly distributed in terms of wavelength and, for example, lie at the edges and in the gaps of the transmission band. The frequency of the phase of all amplitude-modulated pump signals should be the same so that the effects add up. Due to the low pump powers and the skillful selection of the wavelength, signal disturbances due to stimulated Raman scatter are largely prevented. The Raman scatter potentially caused by amplitude-modulated pump signals can be utilized, as warranted, for improving the transmission properties, such as a correction of the tilt.

A broadband or directly modulated, chirping laser or an incoherent light source can be employed as a source of the amplitude-modulated pump signal.

A broadband pump signal can also cover the payload channels when the required noise ratio is not downwardly exceeded as a result thereof, for example given wave division multiplex systems with a channel data rate up to 2.5 Gbit/s.

Other advantages and features of the invention will be readily apparent from the following description of the preferred embodiments, the drawings and claims.

DESCRIPTION OF THE PREFERRED EMBODIMENTS

Figure 1:
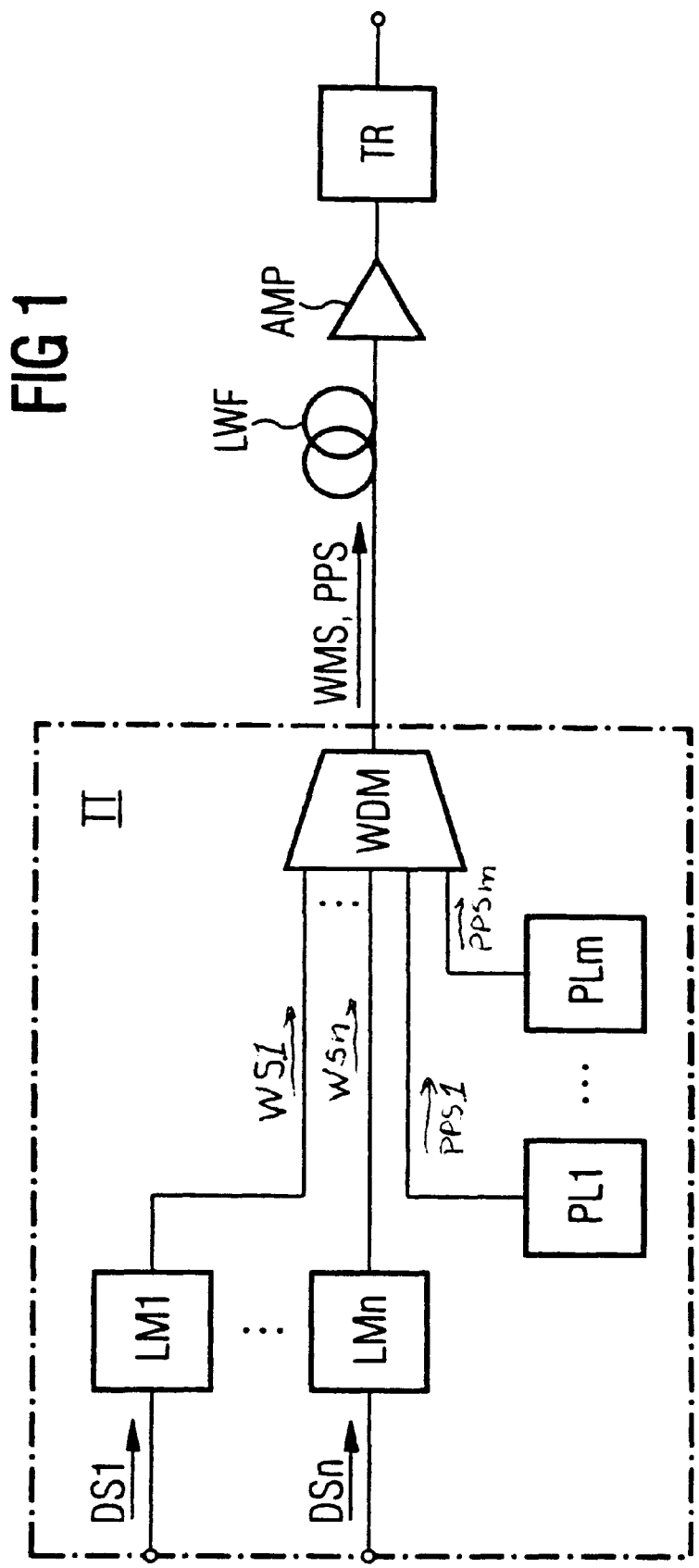
FIG. 1 is a diagram of an arrangement for supplying a plurality of amplitude-modulated pump signals.

The present invention is particularly useful in an optical transmission path with a transmission terminal TT, which is diagrammatically illustrated in FIG. 1. The transmission terminal TT is connected by a transmission fiber or optical fiber LWF through an optical amplifier AMP to a reception terminal TR. The transmission terminal TT contains a plurality of laser modulator means LM1–LMn to which binary data signals DS1–DSn are supplied. Each of these data signals modulates a carrier signal that exhibits a different wavelength. The transmission signals WS1–WSn generated in this way are combined by a wavelength-division multiplexer WDM to form a wavelength-division multiplex signal WMS and are transmitted via the optical fiber LWF through a line amplifier AMP. Additionally, a plurality of amplitude-modulated pump signals PPS1–PPSm or at least one pump signal from pump signal sources PL1–PLm are supplied into the transmission fiber LWF. These pump signals create an additional cross-phase modulation and, thus, a lowering of the carrier amplitude. The infeed of the amplitude-modulated pump signals PPS1–PPSm can also occur in a dispersion compensation fiber DCF preceding the actual transmission fiber and, of course, can also occur via a further wavelength-division multiplexer or via some other suitable coupling device.

The plurality of pump signal sources PL1–PLm and the power of the amplitude-modulated pump signals is selected according to the demands made of the SBS suppression. Due to the low-pass effect of a dispersive fiber, a sine-shaped modulation of the pump signal should preferably occur with a frequency above the Brillouin bandwidth between 20 MHz and 500 MHz. The amplitude-modulated pump signals are distributed in terms of wavelength and their power such that all transmission signals have an optimally identical spacing from the critical Brillouin power.

The spacing of the transmission channels from one another can be selected so that they effectively promote the SBS suppression by mutual cross-phase modulation. Due to the division of the pump energy into a plurality of sources, both SBS as well as the signal disturbances due to stimulated Raman scatter, are avoided. Broadband lasers or incoherent light sources, such as light-emitting diodes or superfluorescent sources are employed as pump signal sources in order to avoid the stimulated Brillouin scattering.

The stimulated Brillouin scattering should optimally be reduced by the same value at all transmission signals WS1–WSn or, respectively, the spacings from the SBS threshold should be at least approximately the same in all transmission channels.

In general, a largely uniform improvement of the SBS suppression for all payload channels can already be achieved by matching the powers of the various pump sources. As warranted, this can be achieved by variation of the channel spacings, by different channel powers or by further channel-associated measures. Below the SBS threshold, the value can also be attached to identical noise ratios of the channels, etc. The channel part can, for example, be individually set in the scope predetermined by the SBS.

When the cross-phase modulation suffices by itself in order to adequately suppress the SBS, pump signals can be supplied given outage of individual signals or given non-occupancy of individual transmission channels.

Figure 2:
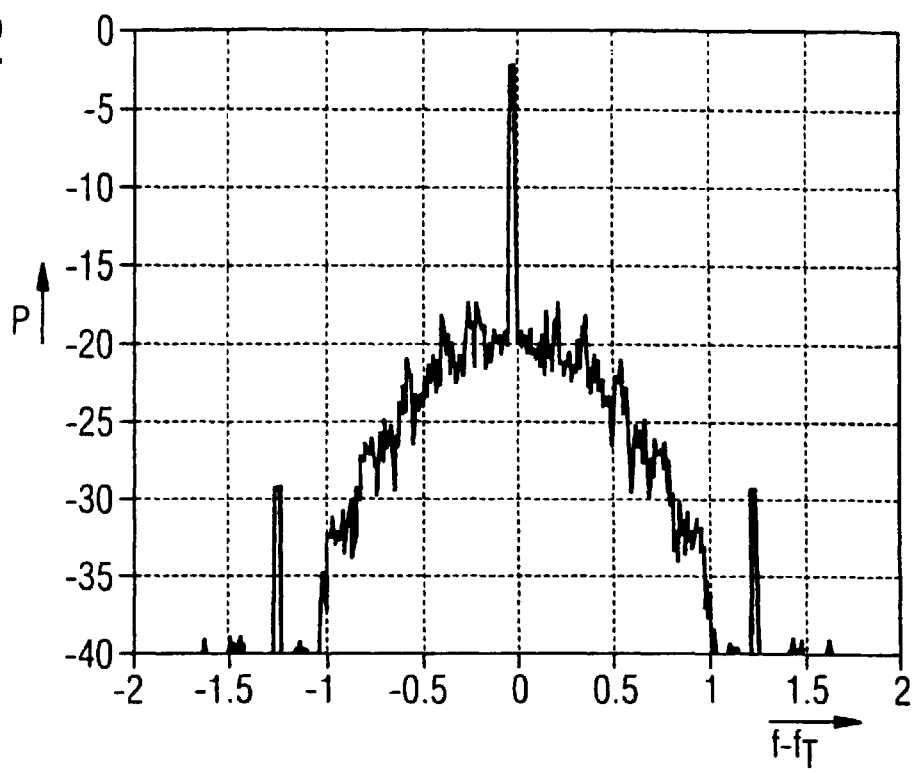
FIG. 2 is a graph illustrating the spectrum of an amplitude-modulated payload channel without cross-phase modulation.

FIG. 2 shows a frequency spectrum of the power P dependent on the frequency difference $f-f_T$, wherein $f_T$ is the carrier frequency of one of eight amplitude-modulated transmission channels of the data rate of respectively 1.2 Gb/s without additional measures. The amplitude of the carrier achieves a value that leads to considerable stimulated Brillouin scattering.

Figure 3:
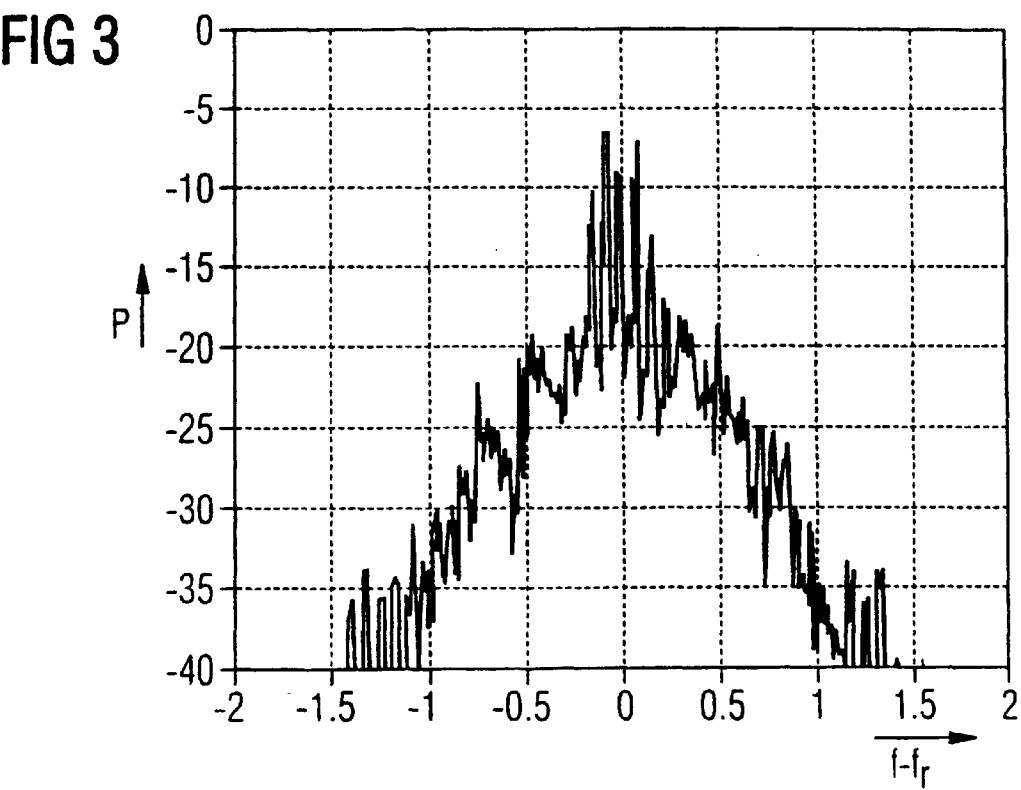
FIG. 3 is a graph illustrating the spectrum of an amplitude-modulated payload channel with cross-phase modulation.

FIG. 3 shows the frequency spectrum over the same channel when an amplitude-modulated pump signal with a power of 160 mW and a modulation frequency of 7.8 MHz is additionally supplied.

Fundamentally, it is also possible to employ only one broadband, amplitude-modulated pump signal source, whose spectrum covers the payload channels.

Figure 4:
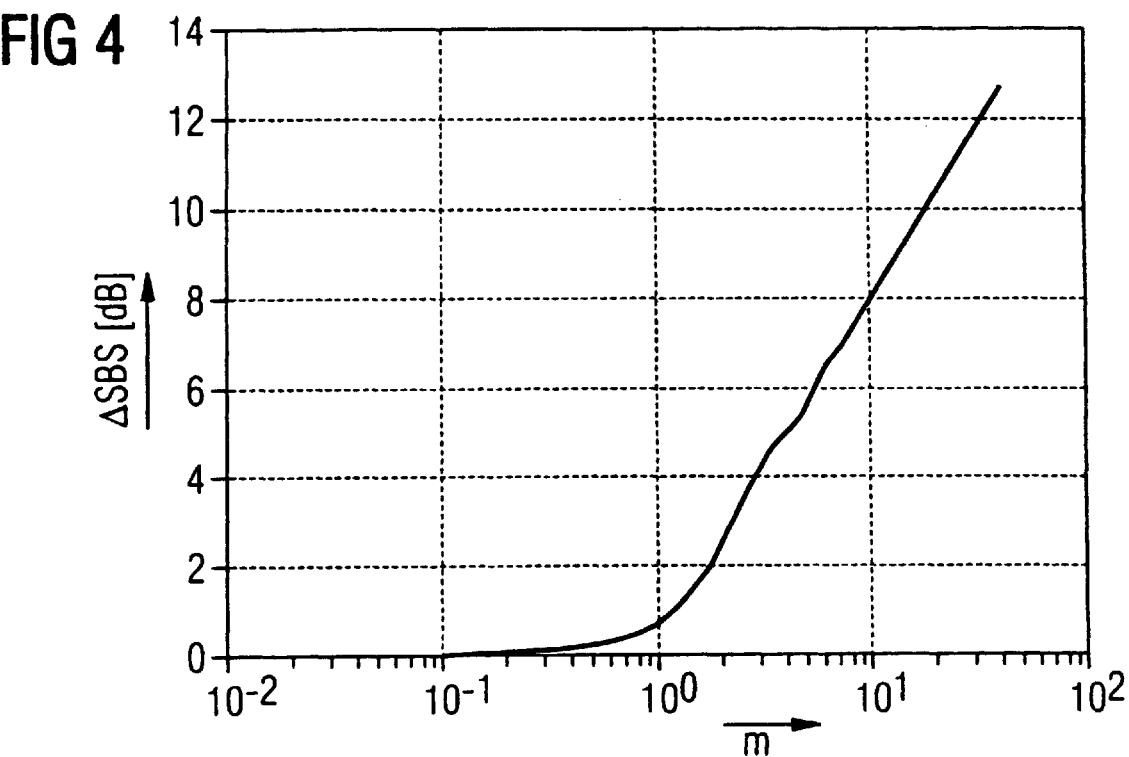
FIG. 4 is a graph illustrating a stimulated Brillouin scattering suppression by a pump signal supplied to the transmission fiber.

FIG. 4 shows the increase of the stimulated Brillouin scattering threshold or critical power ΔSBS due to the infeed of a pump signal into a standard monomode fiber dependent on the modulation index m. Given conditions that are otherwise constant, this is defined by the power of the pump signal. The modulation frequency of the pump signal is adapted to the Brillouin bandwidth and is constant. As soon as a spread of the spectrum proceeding beyond the Brillouin bandwidth occurs due to the cross-phase modulation, a reduction of the SBS or, respectively, an increase of the critical power of the payload signal occurs.

Figure 5:
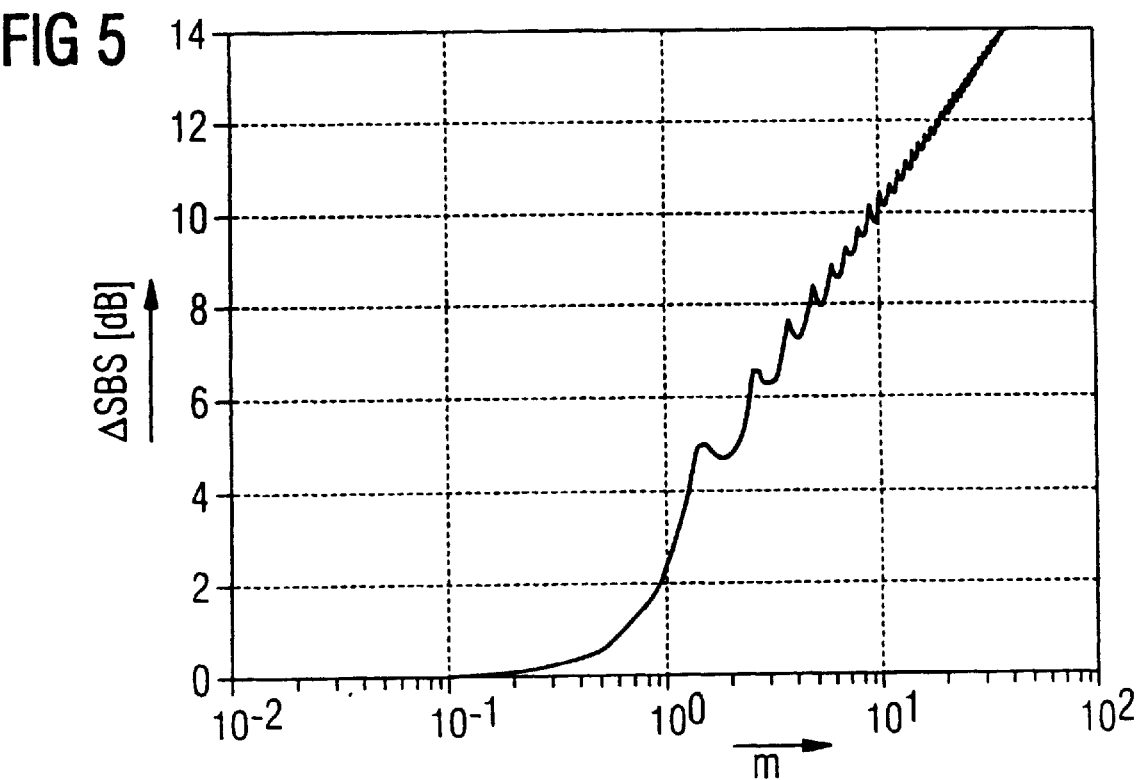
FIG. 5 is a graph showing the stimulated Brillouin scattering suppression by a pump signal supplied into a dispersion-compensating fiber.

FIG. 5 shows a change of the SBS threshold $\Delta$SBS given infeed of the pump signal into a dispersion-correcting fiber DCF, dependent on the modulation index m. A specific ripple, which is dependent on the power of the pump signal, is thereby visible. A better SBS suppression can sometimes be achieved given a somewhat reduced power.

A slight deterioration of the eye aperture can occur as a result of the pump signals due to the stimulated Raman scatter, as a result whereof the reception quality is somewhat restricted. Since, however, the pump signal or signals is or are likewise present at the reception side, the disturbances can be eliminated by subtraction from the reception signal or by an additional modulation of the transmission signals.

Although various minor modifications may be suggested by those versed in the art, it should be understood that we wish to embody within the scope of the patent granted hereon all such modifications as reasonably and properly come within the scope of our contribution to the art.

We claim:

1. A method for the transmission of intensity-modulated light waves or light pulses comprising providing an optical fiber, conducting light pulses comprising a spectral power density distribution causing Brillouin backscatter, generating a spread of a frequency spectrum that reduces the stimulated Brillouin backscatter in the fiber by a self-phase modulation.

2. A method according to claim 1, wherein the step of providing an optical fiber provides optical fibers that have an increased self-phase modulation as compared to traditional optical fibers.

3. A method according to claim 1, which includes inserting elements that effect an increased self-phase modulation into the optical fiber.

4. A method for the parallel transmission of a plurality of intensity-modulated light waves or light pulses having different wavelengths via an optical fiber, comprising providing the optical fiber, conducting light in a form selected from light waves and light pulses having a spectral power density distribution that will cause Brillouin backscatter through the optical fiber, the improvements comprising cross-phase modulating the light waves and light pulse sequences to influence one another by enlarging the frequency spectrum of at least one wavelength so that the stimulated Brillouin backscatter is reduced.

5. A method according to claim 4, which includes selecting the spacing of the light wavelengths so that the frequency spectra of all light waves and light pulses are reduced.

6. A method according to claim 4, wherein the light pulse sequences are generated by amplitude modulation.

7. A method according to claim 4, wherein additional measures occur for reducing the Brillouin backscatter by spreading the spectrum of the light waves or light pulses.

8. A method according to claim 4, wherein the light is additionally angle-modulated.

9. A method for suppressing stimulated Brillouin backscatter in the transmission of an intensity-modulated optical transmission signal or of a plurality of intensity-modulated optical transmission signals with different wavelengths over an optical fiber, comprising providing the optical fiber, introducing an optical signal into the optical fiber, wherein said optical signal has a spectral power density distribution that, without additional measures, causes stimulated Brillouin backscatter, the improvements comprising supplying at least one amplitude-modulated pump signal into the optical fiber to influence the optical transmission signals by cross-phase modulation, so that the frequency spectrum thereof is spread such that the stimulated Brillouin backscatter is reduced.

10. A method according to claim 9, wherein the step of supplying inserts a plurality of amplitude-modulated pump signals into the fiber, which signals are arranged in terms of wavelength so that identical spacings from the critical powers causing the stimulated Brillouin scattering occurs at all transmission signals.

11. A method according to claim 10, wherein the power of the individual amplitude-modulated pump signals is varied so that identical spacing from the critical power causing the stimulated Brillouin scatter occurs at all transmission signals.

12. A method according to claim 9, wherein the pump signals are amplitude-modulated with the same modulation frequency and the same modulation phase.

13. A method according to claim 9, wherein the broadband amplitude-modulated pump signal being supplied is a pump signal having a spectra that lies outside the transmission band of the transmission signals and/or between the transmission signals.

14. A method according to claim 13, wherein incoherent pump signals are fed into the optical fiber.

15. A method according to claim 9, which includes at least one angle-modulated and amplitude-modulated pump signal being fed into the spectrum covering the transmission signals.

16. A method according to claim 9, wherein at least one pump signal is fed in given outage or non-occupancy of at least one transmission signal given wavelength-division multiplex systems.

17. A method according to claim 9, wherein at least one pump signal having a modulated frequency that is higher than the Brillouin bandwidth and lower than 600 MHz is fed into the standard monomode fiber.

18. A method according to claim 9, wherein the pump signals are sine-shaped modulated.

19. A method according to claim 9, wherein a wavelength-related spacing between transmission signals is selected so that, due to mutual cross-phase modulation, the signals promote the suppression of the stimulated Brillouin backscatter by an amplitude-modulated pump signal.

20. A method according to claim 9, wherein the modulation frequency and power of the frequencies of the pump signals are matched so that an uniform power spacing of the transmission signals from the critical powers causing the stimulated Brillouin scattering occurs.

21. A method according to claim 9, wherein disturbances caused by cross-phase modulation due to at least one pump signal are compensated at the receive side.

* * * * *